United States Patent [19]

Foley, Jr.

[11] 4,243,790
[45] Jan. 6, 1981

[54] STYRENE/HYDROXY ALKYL ACRYLIC ACID ESTER COPOLYMER FOR CONTACT LENSES

[76] Inventor: William M. Foley, Jr., 2551 Sleepy Hollow, Glendale, Calif. 91206

[21] Appl. No.: 920,670

[22] Filed: Jun. 30, 1978

Related U.S. Application Data

[63] Continuation-in-part of Ser. No. 797,005, May 16, 1977, abandoned.

[51] Int. Cl.³ .................. C08F 212/08; C08F 220/20; G02C 7/04
[52] U.S. Cl. .................... 526/320; 351/160 R; 351/160 H; 526/293; 526/313; 526/317; 526/323.2; 526/329.2
[58] Field of Search ............ 526/317, 320, 323.2, 526/329.2; 351/160 R, 160 H

[56] References Cited

U.S. PATENT DOCUMENTS

| | | | |
|---|---|---|---|
| 3,072,622 | 1/1963 | Ham | 526/329.2 |
| 3,080,348 | 3/1963 | Lang et al. | 526/329.2 |
| 3,503,942 | 3/1970 | Seiderman | 526/320 |
| 3,728,315 | 4/1973 | Gustafson | 526/320 |
| 3,784,540 | 1/1974 | Kliment et al. | 526/320 |
| 3,787,340 | 1/1974 | Labana et al. | 526/320 |
| 3,892,721 | 7/1975 | Gustafson | 526/320 |
| 3,957,362 | 5/1976 | Mancini et al. | 526/320 |
| 3,983,083 | 9/1976 | Kaetsu et al. | 526/320 |
| 3,988,274 | 10/1976 | Masuhara et al. | 526/320 |
| 4,028,295 | 6/1977 | Loshaek | 526/320 |

*Primary Examiner*—Harry Wong, Jr.
*Attorney, Agent, or Firm*—Knobbe, Martens, Olson, Hubbard & Bear

[57] ABSTRACT

A novel contact lens having improved gas permeability is disclosed which is formed from copolymerizing a mixture comprising:
(a) a group 1 monomer which is a styrene or substituted styrene monomer, and
(b) a group 2 monomer which is a monomer of the general formula:
(i)

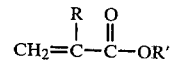

wherein R is hydrogen or methyl and R' is an alkyl,
or a monomer of the general formula:
(ii)

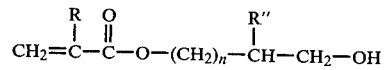

wherein n is 0 or 1, R is hydrogen or methyl, and R" is hydrogen when n is 0 and hydrogen or hydroxyl when n is 1.

7 Claims, No Drawings

STYRENE/HYDROXY ALKYL ACRYLIC ACID ESTER COPOLYMER FOR CONTACT LENSES

This is a continuation-in-part of my co-pending application Ser. No. 797,005 filed May 16, 1977, now abandoned.

BACKGROUND OF THE INVENTION

It is well known that contact lenses are becoming more and more popular in our society. Many people are wearing contact lenses as opposed to conventional eyeglasses for reasons of convenience, improved appearance, lighter weight, and correction of sight abnormalities over a broad visual field. Most conventional contact lenses are made from methyl methacrylate. Lenses made from this material are known as "hard lenses". These lenses suffer from many deficiencies. For example, such lenses frequently produce corneal edema and/or a condition of extreme discomfort to the wearer's eye after repeated periods of extended wear, i.e., eighteen hours or more. This situation is known to be due to "oxygen starvation" and may also be associated with inadequate dissipation of carbon dioxide.

The epithelium of the cornea requires oxygen which is usually supplied from the oxygen dissolved in tears. However, because of the manner in which lenses conform to the contour of the eye, the flow of lacrimal fluid is greatly curtailed beneath the lens. This reduction in fresh lacrimal fluid is not desirable as it substantially reduces the contact of the eye with oxygen. Therefore, it is extremely important that the the lens material itself be gas permeable. Prior art lenses have been of a material and thickness which fails to admit sufficient oxygen and/or release sufficient carbon dioxide to maintain a healthy normal condition for the eye tissue and cornea covered, especially when the lens is worn continuously for extended periods of time. In other words, the conventional lens cannot breathe through the body of the lens satisfactorily.

Due to the above problems, many workers in the field have experimented with the production of soft contact lenses. The presently known soft lenses are made of hydrophilic polymers, mainly comprising polyhydroxethyl methacrylate (known in the art as "HEMA"). These hydrogel soft lenses are an improvement over the hard lenses but the materials themselves are not gas permeable. However, these materials absorb water and swell until equilibrium is attained and therefore possess a high degree of hydration which is directly related to the mode of oxygen transport. The highly hydrated lenses are able to obtain satisfactory oxygen transport levels but suffer from several resulting problems. First, since the soft lenses are used in the swollen state, the molecular materials of their composition are markedly reduced in mechanical strength and are extremely fragile. Due to this fragileness, the thickness of the lens must be increased and therefore these prior art soft lenses are ill-suited for the preparation of ultra-thin corneal lenses. By increasing the thickness of the lens, the gas permeability of the lens is thereby decreased forming a vicious cycle between gas permeability and strength.

In making an ultra-thin lens, the greater the strength and the greater the refractive index of the material used, the better the resulting thin lens.

A second problem associated with the prior art soft lenses is that since they are always worn in the wet and swollen state, they are easily contaminated with bacteria. Therefore, they need to be sterilized once a day by boiling. This boiling treatment is not only troublesome, but often causes decomposition and breakdown of the lens material. Thus, the prior art soft lenses are very short lived.

The disclosed invention obviates the above deficiencies in the prior art by providing a copolymer suitable for producing contact lenses which have a superiorly high strength and refractive index, that can withstand sterilization, and, in addition, offer superior gas permeability. These properties make the fabrication of an ultra-thin lens a practical reality.

SUMMARY OF THE INVENTION

A novel contact lens is disclosed which is formed from copolymerizing a mixture of:
 (a) a group 1 monomer which is a styrene or substituted styrene monomer, and
 (b) a group 2 monomer which is a monomer of the general formula:
  (i)

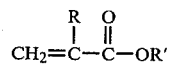

wherein R is hydrogen or methyl and R' is an alkyl,
or a monomer of the general formula:
 (ii)

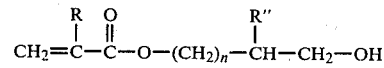

wherein n is 0 or 1, R is hydrogen or methyl, and R" is hydrogen when n is 0 and hydrogen or hydroxyl when n is 1.

The Group 1 monomer will be hereinafter referred to as "styrene material" and the Group 2 monomer will be hereinafter referred to as an "acrylate material". Preferably, a suitable cross-linking agent is added to give desired strength. The styrene material is up to 95% by weight of the monomer mixture. The acrylate material is 5 to 99% by weight of the monomer mixture. The styrene material content controls the stiffness of the resulting contact lens whereas the acrylate material controls the level of hydration. In addition, the styrene helps produce a gas permeable lens due to its chemical nature. More particularly with 20 to 30% by weight styrene material and balance mainly acrylate material, a soft contact lens results which is highly hydrated, e.g., 35% to 50% relatively strong, and possesses good optics and machinability. Preferably up to 10% by weight methacrylic acid is added in order to increase the elasticity and hydration of the resulting soft lens.

Alternatively, for a hard lens 40 to 50% by weight of styrene material is used with no methacrylic acid being added.

The styrene material content may be increased to above 50% to produce a gas permeable hard lens, although hydration levels will decrease below 20% as the proportion of acrylate material decreases. With a styrene material content of 80% or greater, up to 10% methacrylic acid may again be added to furnish additional hardness to the resulting lens.

Importantly, a polymerizable antiseptic comonomer may be added to the mixture to produce a lens which eliminates the nightly sterilization procedure. Another important feature of the invention is that the copolymer may be produced from conventional lens production techniques including cutting and polishing at room temperature.

Thus, the disclosed invention is a contact lens possessing all of the following properties:

1. A biocompatible lens material with excellent tissue compatability;

2. A chemically inert lens material which will resist hydrolysis even on boiling or immersion in alcohol;

3. A fine, very clear optical lens material with excellent refraction (e.g., styrene at about 1.56 with acrylate at 1.45);

4. A lens material of surprisingly good gas permeability since styrene materials, contrary to the conventional methyl methacrylate, enhance gas permeability;

5. A lens material which can tolerate a very high degree of hydration and yet retain its strength further enhancing gas permeability;

6. Good lens strength and toughness despite relatively high hydration and thin cross-section, e.g., a lens with 48% hydration and only about half a millimeter thick was found to have serviceable strength during handling while with prior art lenses, such thickness would render the lens too fragile;

7. A lens of superior mechanical integrity (even as an ultra-thin lens) having dimensional stability when boiled, molded, or machined while still being elastic and highly hydrated as a soft lens.

8. Surprising "graft-susceptibility", e.g., for grafting a bifocal section into a conventional soft lens;

9. A lens material that is surprisingly practical and inexpensive, styrene being commonly available at low cost.

DESCRIPTION OF THE PREFERRED EMBODIMENTS

The contact lens of the disclosed invention is formed from copolymerizing an acrylate material and a styrene material.

The styrene material will be understood as comprising any form of styrene or substituted styrenes such as alpha-aryl or alpha-alkyl styrenes or vinyltoluene or a like alkylated or halogneated styrene.

The acrylate material will be understood as comprising any monomer of the formula

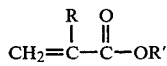

wherein R is hydrogen or methyl and R' is an alkyl. Also any hydroxy substituted propyl or ethyl acrylate or methacrylate is acceptable. This includes dihydroxy alkyl acrylates and methacrylates such as 2,3-di hydroxypropyl methacrylate. Most preferably, the acrylate material is 2-hydroxy-ethyl methacrylate hereinafter referred to as HEMA. Preferably, the copolymerization of these monomers is enhanced with cross-linking agents such as divinyl benzene, ethylene glycol dimethacrylate or diacrylate, diethyleneglycol dimethacrylate, or triethyleneglycol dimethacrylate hereinafter referred to as TEGDMA, or the like. The percentage of cross-linking agent is up to 10% by weight and preferably around 1%.

Varying the relative contents of the acrylate and styrene material provides control over the properties of the resulting lens. The higher the styrene material content, the stiffer the lens. Conversely, the higher the acrylate material content, the more hydrated the lens. Up to about 95% of the styrene material may be employed. However, percentages of styrene material above about 30% produce a "hard lens". The preferred styrene material content for a "soft lens" is about 20% to 30%.

Up to about 10% methacrylic acid may be added to the monomer mixture with styrene percentages up to about 30%. The acid increases the elasticity and hydration of the resulting lens.

A preferred soft lens composition is 20% to 30% styrene, 2% to 3% methacrylic acid, 1% cross-linking agent, and balance acrylate material. This gives a strong but elastic lens with high hydration, i.e. minimum of 30%, and good gas permeability.

With styrene material percentages of 40% to 80% methacrylic acid should not be added as poor optical properties may result. A preferred hydrate d "hard lens" formulation is 40% to 50% styrene, 1% cross-linking agent, and balance acrylate material. The hydration level will be about 20%.

If the styrene material content is increased above 50%, the hydration level of the resulting hard lens will decrease below 20%. However, a high quality, gas permeable lens can be obtained with percentages of styrene material up to about 95%. Moreover, with styrene material contents of 80% or more, methacrylic acid may be added to increase the hardness of the resulting lens without a decrease in optical quality.

An extremely important feature of the invention is the discovery of antiseptic moieties which may be added to the monomer mixture that will eliminate the need for nightly sterilization. This additional comonomer produces an "aseptic" contact lens new to the art. Thus, the lens eliminates the need for nightly sterilization required by all current hydrateable lenses.

In this aseptic formulation, the antiseptic moiety is directly bound to the polymer backbone, and cannot be removed.

The antiseptic grouping is a hydroxy substitued benzene. Preferable moieties are phenols, resorcinals, and catechols. In addition, this moiety must have a polymerizable functionality. This functionality can be any —C=C— and must be bonded to the benzene ring in addition to the hydroxyl groups. Examples of such polymerizable groups are vinyls, allyls, methacrylyls and acrylyls. Therefore, the polymerizable antiseptic moieties contemplated by this invention are exemplified as follows:

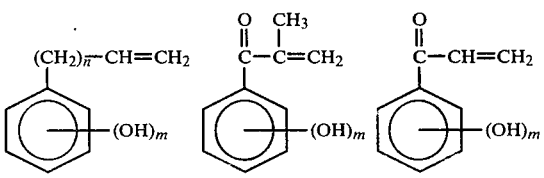

wherein n is an interger 0 or greater and m is 1, 2 or 3. Most preferably up to 3% by weight of the antiseptic moiety may be added.

It must be remembered, however, that the substituted phenols and the like have a structural resemblance to hydroquinone, hydroquinone monomethyl ether, and t-butyl catechol and therefore will have a somewhat inhibiting effect on the polymerization. This effect may be overcome by additional initiator, a common procedure for those skilled in the art.

A further advantage of the above-mentioned antiseptic moieties lies in the fact that they may be added to other current soft lens formulations, e.g., hema-methylmethacrylate copolymer, rendering them permanently aseptic and without significantly changing any other properties.

An important feature of the present invention is that the production of the lenses may be achieved by relatively conventional methods, so that the lenses may be successfully produced in commercial quantities.

In order to effect polymerization, the monomers are blended to homogenity. This mixture is then poured into molds (teflon or polyethylene) where curing takes place. Free radical initiators such as azobis isobutyronitrile, t-butyl peroctoate, t-butyl neodecanoate, t-butyl perpivalate, benzoyl peroxide, isopropyl percarbonate, or 2,5-dimethyl 2,5-diper-2-ethylhexoate, or the like may be used to begin the copolymerization.

Polymerization (curing) may be carried out quite conventionally with such initiators between about 40° and 100° C. Preferably, the mixture is cured in the molds at about 79° C. for about 1–1½ hours to form cylindrical lens blanks. The blanks are then annealed for 3 hours at 85° C., and then cut and polished at room temperature to form contact lenses. In the soft lens embodiment, they are then hydrated.

The following working examples are illustrative only and are not to be construed as limiting the scope of the invention. The lenses were prepared conventionally as outlined above unless otherwise specified.

Table 1 provides some typical preferred proportions of materials found quite satisfactory for "soft lens" and "hard lens" formulations.

TABLE I

| Examples 1-6 | "Styrene" Material Wt % | "HEMA" Material Wt % | Cross-Linker Wt % | Methacrylic Acid Wt % |
|---|---|---|---|---|
| Soft Lens | | | | |
| 1 | 20 | 76 | 1 | 3 |
| 2 | 30 | 66 | 1 | 3 |
| 3 | 5 | 94 | 1 | 0 |
| Hard Lens | | | | |
| 4 | 93.5 | 4.0 | 1.5 | 1 |
| 5 | 83.5 | 14.0 | 1.5 | 1 |
| 6 | 73 | 25 | 2 | 0 |

Generally speaking, some very surprising contact lens properties are found for examples 1, 2, and 3. About 29% or more hydration has been realized along with good optical properties and strength which will withstand boiling for sterilization purposes. This is a considerable improvement over "conventional" soft lenses, especially in view of the elasticity rendered which was over 6× before rupture.

The "hard lens" formulations were surprisingly satisfactory with similar properties, except for reduced hydration and being inelastic, of course.

EXAMPLE 7

A preferred "soft lens" is prepared by copolymerizing styrene and HEMA, along with methacrylic acid and a cross-linking agent according to the invention, in the following preferred proportions:

TABLE II

| | | |
|---|---|---|
| Styrene Material | Styrene (Dow S 12T, b.p. 143°–144° C. Atm.) | 10.0 gm |
| HEMA Material | 2-hydroxethyl methacrylate (sipomer CL-100, Alcolac Chemical Co., freshly distilled) | 40.0 gm |
| Methacrylic Acid | Methacrylic acid (99.4%, Rohm & Haas Co.) | 1.5 gm |
| Cross-Linking Agent | Triethyleneglycol dimethacrylate (Haven Chemical Co.) | 0.5 gm |
| Initiator | 2,5-dimethylhexane-2,3-diper-2-ethylhexoate (U.S. Peroxygen Division, Witco Chemical Co., U.S. P. 245) | 8 Drops |

The resulting material is very satisfactory for use as a soft lens being very tough, yet elastic, with good optics, sterilizable by boiling or saline immersion and hydrateable to 48%. Even when so hydrated and formed into an ultra-thin contact lens, the material is very tough and durable, tolerating manual handling and boiling.

The material has improved permeability to oxygen and carbon dioxide. Small sections of these polymers may be formed and then 2-hydroxyethyl methacrylate graft polymerized to give a lens blank from which a bifocal contact lens may be made. Also soft contact lenses, with corrections for astigmatism, may be conveniently made.

The improved oxygen and carbon dioxide permeability, coupled with the ultra-thin lens cross-section, afford a soft contact lens with a much greater degree of comfort than previously possible.

EXAMPLE 8

To illustrate the close control over hydration and rigidity attainable with the claimed invention, the styrene content was increased over that in Example 7. The resulting composition was: 40% styrene, 57% HEMA, 2% methacrylic acid, and 1% TEGDMA. The monomer mixture was copolymerized by the conventional method. The mixture yielded a novel copolymer suitable for a "hard lens" which is readily "wettable", about 24% hydrateable, and with surprisingly high permeability to $O_2$ and $CO_2$ gas.

EXAMPLES 9–16

Table III below indicates eight modified contact lens formulations, understood as prepared as with Example 7, above, to yield the properties indicated, vatiations A through F indicating the effects of varied methacrylic acid concentration.

TABLE III

| | Variation A: 1% MAA | | Variation B: 1.5% MAA | | Variation C: 2% MAA | | Variation D: 3% MAA | | Variation E: 5% MAA | | Variation F: No MAA | |
|---|---|---|---|---|---|---|---|---|---|---|---|---|
| | % Hyd | Elas | % Hyd | Elas | % Hyd | Elas | % Hyd | Elas | % Hyd | Elas | % Hyd | Elas |
| #9. 5% Styrene 94% HEMA 1% TEGDMA | | | | | | | | | | | 29.1 | 6.4 |
| #10. 10% Styrene | | | | | | | | | | | 24.3 | 5.9 |

TABLE III -continued

| | | Variation A: 1% MAA | | Variation B: 1.5% MAA | | Variation C: 2% MAA | | Variation D: 3% MAA | | Variation E: 5% MAA | | Variation F: No MAA | |
|---|---|---|---|---|---|---|---|---|---|---|---|---|---|
| | | % Hyd | Elas | % Hyd | Elas | % Hyd | Elas | % Hyd | Elas | % Hyd | Elas | % Hyd | Elas |
| #11. | 89% HEMA 1% TEGDMA 10% Styrene | 31.3 | 6.8 | | | | | | | | | 24.3 | 5.9 |
| #12. | 88-89% HEMA 1% TEGDMA 15% Styrene | | | 34.2 | 6.9 | | | | | | | | |
| #13. | 82.5% HEMA 1% TEGDMA 20% Styrene 77-79% HEMA | | | | | 38.7 | 5.6 | 48 | 6.4 | | | 18.8 | Inelastic-NB |
| #14. | 1% TEGDMA 30% Styrene 66-69% HEMA | | | | | 35.5 | 6x NB | 45.6 | 6x NB | | | 17.7 | Inelastic-NB |
| #15. | 1% TEGDMA 40% Styrene 56-59% HEMA | | | | | 24.1 | Not Break | 41.8 | 2x NB | | | | |
| #16. | 1% TEGDMA 48% Styrene 48% HEMA 1% TEGDMA | | | | | | | 36.3 | 2-3x NB | | | | |

NOTE:
NB = Did not rupture under tension.

In all cases, it will be understood that except as otherwise indicated, a very satisfactory lens material was derived, with satisfactory (dry/wet) optical properties, satisfactory hydration (i.e., 30+% minimum hydration as water-saturation) and elasticity (for soft lens, i.e., minimum 2–4× linear stretchability limit).

Certain of the lens formulations in Table III provided good to excellent "soft lens" material, for example, 9-F, 11-A, 12-B, 13-C, 13-D, 14-C, and 14-D, though 14-d exhibited poor "optics" in the wet, hydrated condition. All of the above exhibited good machineability. Those providing good to excellent "hard lens" material were, for example, 10-F, 11-F, 13-F, 14-F, 15-C, and 16-D, which exhibited good to excellent optics, except for 15-D and 16-D whose optics were fair to poor especially when "wet". Here, it my be assumed that about 30% minimum hydration is needed for a good "soft lens".

Regarding elasticity, workers will agree that a good soft lens should have about "4–5×" (stretchable elongation under tension) elasticity; accordingly, it should be noted that Examples 13-F, 15-C, and 14-F were relatively "inelastic" and tough whereas Examples 15-D and 16-D were "marginally elastic" (i.e., 2–3×), but were quite "tough" (i.e., did not rupture under tension). Examples 14-C and 14-D were both "tough" and relatively elastic.

More particularly, Example 15-D will be seen as substantially equivalent to Example 7 and somewhat "preferred" for a soft lens being relatively strong and yet flexible, especially when dry and highly hydrated. Examples 11-C and 11-D are similar except they were more flexible, both wet and dry. Example 16-C, on the other hand, yielded a good "hard" lens material, being relatively rigid and strong, with about 24% hydration.

An unexpected criticallity was found in the amount of methacrylic acid which can be added to the formulation and still maintain good optical quality both wet and dry. Surprisingly, it was also found that the amount of styrene entered into this criticallity. Less than or more than the ideal amounts of both styrene and methacrylic acid reduced optical quality both wet and dry, the ideal range being 20–30 wt. % styrene and 2–3 wt. % methacrylate acid. Again, surprisingly, where there was no methacrylic acid present, optical quality was good both wet and dry for the entire range of samples tested. With about 40% styrene and the balance, no methacrylic acid gave satisfactory optics, whereas adding a few % methacrylic acid gave poor optics wet.

We claim:

1. A contact lens consisting essentially of the polymerization product of from about 5% to about 93.5% of styrene monomer, from about 4% to about 94% of acrylic monomers of the general formula

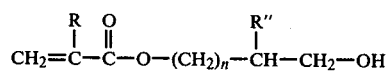

wherein n is 0 or 1, R is hydrogen or methyl, and R" is hydrogen when n is 0 and hydrogen or hydroxyl when n is 1, and an effective amount of cross-linking monomer and optionally up to about 10% methacrylic acid.

2. The contact lens of claim 1 wherein the styrene content is from about 20% to about 30% and the contact lens is a soft contact lens.

3. The contact lens of claim 1 wherein the styrene content is from about 40% to about 50% and the contact lens is a hard contact lens.

4. The contact lens of claim 1 wherein the acrylic monomer is hydroxyethyl methacrylate.

5. The contact lens of claim 2 wherein the acrylic monomer is hydroxyethyl methacrylate.

6. The contact lens of claim 3 wherein the acrylic monomer is hydroxyethyl methacrylate.

7. The contact lens of claim 1 wherein styrene comprises from about 80% to about 95% of the polymer of the lens.

* * * * *